Sept. 9, 1958 E. HANSON 2,851,290
AXIALLY COMPRESSIBLE SHAFT SEAL
Filed July 14, 1954 2 Sheets-Sheet 1

INVENTOR.
EDWARD HANSON
BY Hudson, Boughton,
Williams, David & Hoffman
ATTORNEYS Sept. 9, 1958     E. HANSON     2,851,290
AXIALLY COMPRESSIBLE SHAFT SEAL
Filed July 14, 1954     2 Sheets-Sheet 2
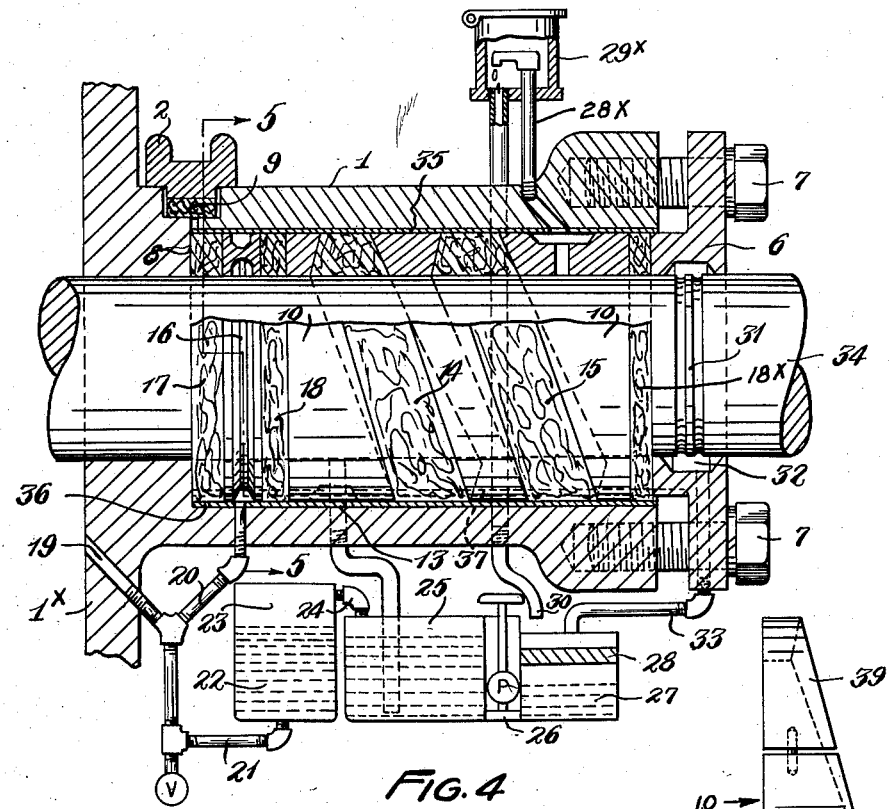
FIG. 4
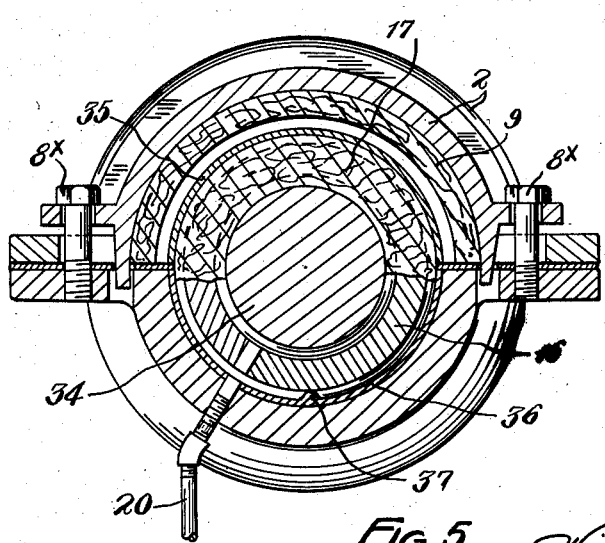
FIG. 5
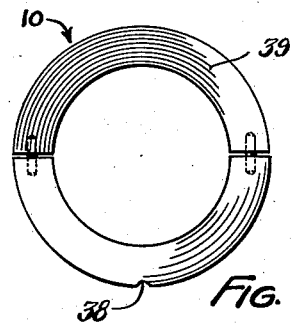
FIG. 6
FIG. 7
INVENTOR.
EDWARD HANSON
BY Hudson, Boughton,
Williams, David & Hoffmann
ATTORNEYS

United States Patent Office 2,851,290
Patented Sept. 9, 1958

2,851,290
AXIALLY COMPRESSIBLE SHAFT SEAL
Edward Hanson, Cleveland, Ohio
Application July 14, 1954, Serial No. 443,356
5 Claims. (Cl. 286—8)

This invention relates to a seal for a shaft, to seal it with respect to a casing through which the shaft extends for the operation of one or more devices therein, the shaft seal serving to prevent the escape or leakage of liquid or gas from the casing.

The object of this invention is to provide an improved seal for a rotary shaft consisting of parts and elements capable of insuring complete lubrication between the rotating shaft and the sealing means, ranging from the moderate pressures and temperatures in smaller equipments to the high pressures and temperatures encountered in the modern power plants.

Another object of this invention is to provide an improved shaft seal housing, part of a side of which may be removed, providing a ready and convenient access to the interior of the same so as to facilitate replacement of worn parts and the inspection of the interior of the shaft seal housing and the parts therein from time to time.

Another object of the invention is to provide an improved shaft seal housing, the interior wall of which is provided with a lining of a material adapted to prevent the formation and accumulation of rust between the lining and lubrication elements, whereby the latter may be readily removed.

Another object of the invention is to provide an improved shaft seal housing consisting of certain improvements in Letters Patents Nos. 2,366,729 and 2,444,874, wherein means are provided for positioning the lubricating and sealing elements in the shaft seal housing in a predetermined relation, whereby displacement of the elements is prevented.

Another object of the invention is to provide an improved shaft seal housing containing a circulation system for a lubricant and lubrication elements capable of adjustment from time to time to insure compression thereof with shaft seal housing walls and shaft without affecting the supply of the lubricant and circulation thereof.

Other objects and advantages of the invention will be apparent to those skilled in the art to which my invention relates from the following description taken in connection with the accompanying drawings, wherein Fig. 1 is a side elevation of a shaft seal embodying my invention.

Fig. 4 is a vertical section of a shaft seal of modified construction, with parts in elevation, and a lubrication system shown diagrammatically.

Fig. 5 is a sectional view of the shaft seal housing and sealing material taken on line 5—5 in Fig. 4.

Fig. 6 is a side elevation of the end pressure rings in shaft seals shown in Fig. 4 and utilized in Figs. 1 and 5.

Fig. 7 is an end elevation of the end pressure ring shown in Fig. 6.

Figure 1:
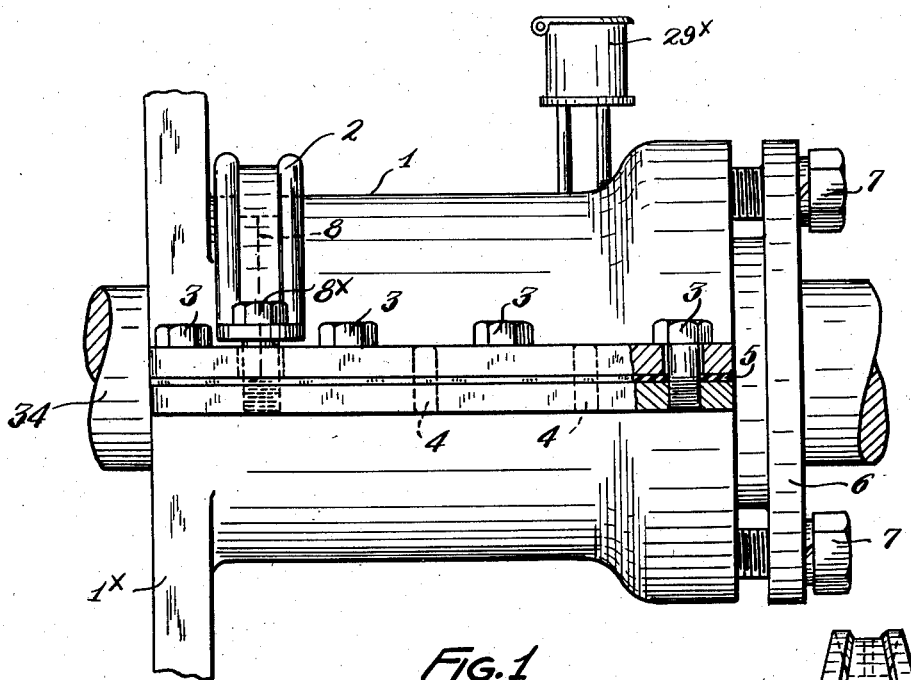

The invention is shown, for illustrative purposes, as applied to and within a hollow extension, herein termed a shaft seal housing, provided on the wall of a casing. Referring to the drawings, the reference character 1 designates a shaft seal housing shown as a part of the casing 1x. While the lower part of this housing is an integral part of the machine casing, the upper half of the housing is split off from the casing along the dotted line 8. A semi-circular clamp 2 with packing 9, shown in Fig. 2, and held down with bolts 8x makes this joint leakproof. The upper part of the seal housing 1 is held together with the lower part by bolts 3. Dowels 4 insure the alignment with lower half and a flat gasket 5 completes a tight joint. A sealing gland follower 6 provides adjustment of the shaft seal packing and pressure rings in the interior of the seal housing by means of the bolts 7.

Figure 2:
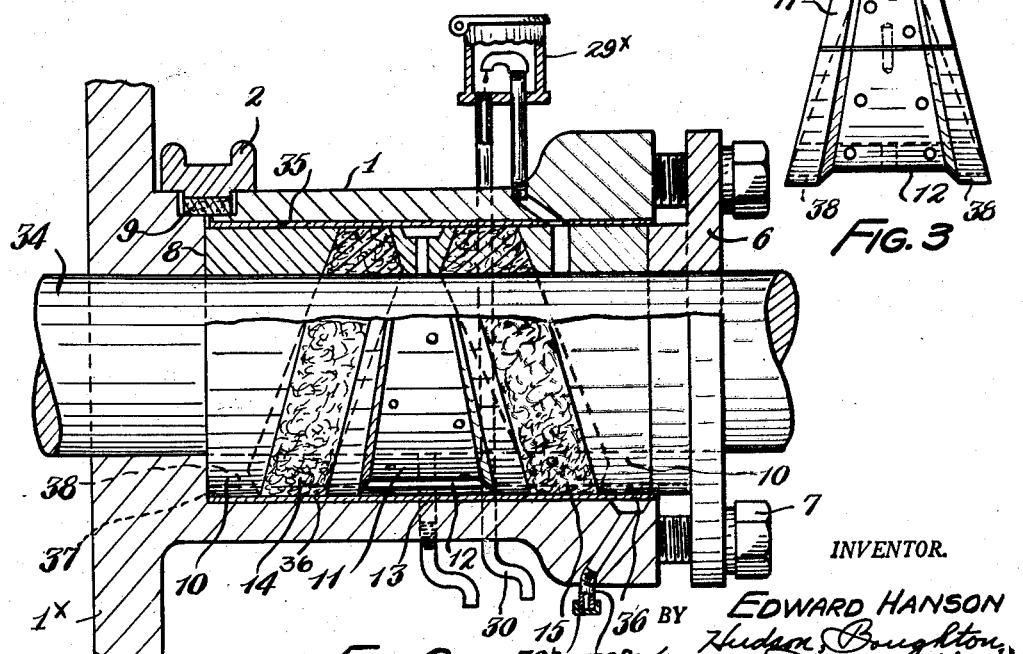
Fig. 2 is a view partly in vertical section and partly in elevation of the shaft seal shown in Fig. 1 with the pressure rings and sealing elements in assembled relation.
Figure 3:
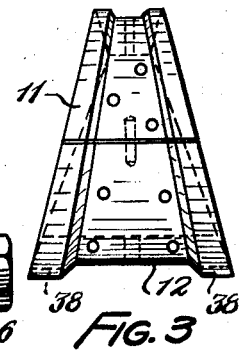
Fig. 3 is a side elevation of the intermediate pressure and lubrication ring shown in Fig. 2.

Fig. 2 is a vertical section of the shaft seal which as shown comprises two packing or sealing elements interposed between two compression rings 10—10 and having a combined compression and lubricating ring 11 in the middle. A packing 9 is covering the joint 8 between the casing 1x and the upper part of the seal housing 1. It will be noted that the end faces of the compression rings 10, 10 facing the middle of the seal are disposed at an oblique angle to the shaft 34 but substantially parallel to the oblique faces of the middle ring 11 thereby effecting a uniform compression of the rings of sealing material 14, 15 when the gland 6 is forced against the sealing and compression members by the adjustment of the bolts 7. The ring 11 also serves as a distributor of the lubricant supplied by the tube 13 into the recess 12 that extends all around the outer surface of the ring 11. The combined compression and lubrication ring, Fig. 3, resembles an isosceles triangle, with about 30% of its top cut off. This geometrical form with the reverse oblique end faces matching the end faces of the compression rings 10 and 10 produces a uniform compression of the sealing rings 14 and 15 by the gland follower 6. The wider base of the ring 11, as viewed in Figs. 2 and 3, combined with a longer dimension of the oil space 12 permits an extended range of movement before losing contact with the oil supply pipe 13. This construction insures longer use and wear of the sealing ring 14 before replacement of same is required. In this design alternative systems of lubrication are provided. For light service, that is, when low pressure is prevailing in the machine and particularly when liquid possessing lubricating qualities is permitted to leak into the shaft seal from the interior of the casing of the machine, a lower oil drain 30a is used for collecting the lubricant and returning it to the oil reservoir. When the machine is used with higher pressure in the casing and shaft seal, a common seal can be placed between the compression ring 10 and the seal gland 6 whereby the lubricant will be confined to the space between the shaft and the inside of the ring 10 and caused to flow into the oil cup 29x to be returned through the tube 30 to the reservoir under the machine. In this operation the lower oil drain 30a is closed by a cap 30b.

Fig. 4 shows a shaft seal of modified construction with an upper section of the shaft seal housing which is similar to the shaft seal housing 1 of Figs. 1 to 2, removable as referred to in Fig. 1 and Fig. 2 with compression rings 10 and sealing rings 14, 15 somewhat similar to that fully described in my Letters Patent No. 2,366,729 dated Jan. 9, 1945 and showing a modification of a Lubrication System described in my Letters Patent No. 2,466,025 dated April 5, 1949. A lantern ring 16 with a sealing ring 17 on one side and another sealing ring 18 on the opposite side of said lantern ring, serves as an equalizer by admitting liquid from the machine casing through pipe 19 and 20 into the lantern ring 16. Liquid of the same pressure also enters the pipe 21 and tank 22 thereby compressing the enclosed air 23 forcing it into tank 25 through tube 24 driving the oil in tank 25 by tube 13 into the seal housing and its sealing assembly, with the result that as the lubricating oil in the shaft seal and the liquid in the casing are under equal pressure, any mixing of the two across the lantern ring 16 is prevented.

When during the operation of the machine the oil in the shaft seal housing reaches the outer compression ring 10 and the seal 18x it will gradually rise through tube 28x into an oil cup 29x from which it will be conveyed into the receiving tank 27 by a tube 30. Any oil that may seep through the seal ring 18x along the shaft 34 will by the oil slinger 31 be conveyed through the internal cavity 32 in the sealing gland 6x into the tube 33 and tank 27. A screen 28 filters the oil before recirculation to the shaft seal. The pump 26 illustrated in Fig. 4 is utilized to replenish the supply of lubricant in tank 25 substantially as described in the aforementioned Hanson Patent No. 2,466,025.

Fig. 5 is sectional detail of the shaft seal housing on line 5—5 in Fig. 4 showing a lining in the seal housing. In this particular arrangement the lining consists of upper and lower semi-circular sleeve sections 35, 36 extending the full length of the inner wall of the seal housing and permanently attached to the inside by welding or other suitable method that will insure a rigid attachment with the body of the seal housing. The lining consists of any non-corrosive material depending on the liquids or chemicals acted upon by the devices in the machine casing. The lower half of the lining 36 is provided with a rib or key 37 extending the full length of the sleeve section. As the various sealing elements and compression rings in the seal housing are provided with a notch or groove 38, see Fig. 7, that fits over the key 37 it follows that any misplacement of these parts in their assembly or their displacement during the rotation of the shaft is prevented. The shaft seal housing shown in Figs. 1 and 2 also contains a similar lining and the sealing elements and compression rings therein are also provided with notches or grooves 38 that fit over the key 37. Fig. 6 is a side elevation of one of the end pressure rings 10 in Fig. 4 and which may be used in Fig. 2, while Fig. 7 is an end elevation of Fig. 6.

To those skilled in the art to which my invention relates, many changes in construction and widely differing embodiments and applications of the invention will suggest themselves without departing from the spirit and scope of the invention. My disclosures and the description herein are purely illustrative and are not intended to be in any sense limiting.

What I claim is:

1. In a shaft seal, the combination of a machine casing having a boss-like shaft seal housing projecting from a wall thereof, said boss-like housing being split lengthwise and including a removable section, a shaft extending through the housing, a shaft seal mounted in said housing in surrounding relation to said shaft, said shaft seal comprising a plurality of substantially rigid annular members having the adjacent sides of a plurality thereof inclined with respect to the axis of said shaft and bevelled toward each other, a deformable sealing member interposed between a plurality of said rigid members, said removable section of said housing being removable radially of said shaft and away from said sealing member, means for supplying lubricant to said shaft seal, and means for applying axial pressure to said annular members whereby said sealing member is forced into sealing engagement with the wall of the shaft seal housing and said shaft.

2. In a shaft seal, the combination of a machine casing having a boss-like shaft seal housing projecting from a wall thereof, said boss-like housing being split longitudinally and including a removable section, a lining of non-corrosive material in said boss-like housing, said lining also being split longitudinally, a shaft extending through the housing, a shaft seal mounted in said housing in surrounding relation to said shaft, said shaft seal comprising a plurality of substantially rigid annular members having the adjacent sides of a plurality thereof inclined with respect to the axis of said shaft and bevelled toward each other, a deformable sealing member interposed between a plurality of said rigid members, means for supplying lubricant to said shaft seal, and means for applying axial pressure to said annular members whereby said sealing member is forced into sealing engagement with the wall of the shaft seal housing and said shaft.

3. In a shaft seal, the combination with a housing and a driven shaft extending through the housing, a shaft seal in surrounding relation to said shaft, said shaft seal comprising at least three rigid annular members, deformable sealing members interposed between said rigid members, means for keying said rigid members to the housing, the end walls of an intermediate one of said members being disposed in planes extending at oblique angles to the shaft in opposite directions and the peripheral surface thereof having an annular recess intermediate its ends and an aperture extending from the recess to the interior thereof, means for supplying lubricant to said annular recess, the rigid members adjacent to an intermediate rigid member having their opposing end walls disposed in planes extending in opposite directions at oblique angles to the shaft and parallel to the adjacent oblique end walls of said intermediate member, and means for applying pressure axially of said shaft to the rigid members for deforming said sealing members and forcing the latter into sealing engagement with the wall of the housing and said shaft.

4. In a shaft seal, the combination of a machine casing having a shaft seal housing projecting from a wall thereof, said housing being split longitudinally and including a movable section, a driven shaft extending through the housing, a shaft seal in said housing in surrounding relation to said shaft, said shaft seal comprising end annular rigid members and an intermediate annular rigid member having end walls defining a truncated triangle, deformable sealing members interposed between the end walls of said intermediate rigid member and the end walls of said end rigid members adjacent thereto, means for keying said end and intermediate rigid members to said housing, said intermediate rigid member having its peripheral surface between said end walls recessed and having aperture communicating with said recess and extending transverse to the shaft axis, said housing having a conduit therein communicating with said recess for supplying lubricant thereto, the end walls of said end rigid members adjacent to the intermediate rigid member being disposed in planes extending at oblique angles parallel to the adjacent wall of said intermediate member, one of said end members being provided with an aperture communicating with the shaft and conduit means for returning lubricant to a sump, and means for applying pressure axially of said shaft to said outer rigid members for deforming said sealing members and forcing the latter into sealing engagement with the walls of said housing and said shaft.

5. In a shaft seal, the combination of a machine casing having a boss-like shaft seal housing projecting from a wall thereof, said boss-like housing being split lengthwise and including a movable portion, a shaft extending through the housing, a shaft seal mounted in said housing in surrounding relation to said shaft, said shaft seal comprising a plurality of substantially rigid annular members, and a sealing member interposed between a plurality of said rigid members, said movable portion being removable radially of said shaft and away from the sealing member.

References Cited in the file of this patent

UNITED STATES PATENTS

| Re. 10,608 | Dingle et al. | June 9, 1885 |
| 485,453 | Goodrich | Aug. 25, 1891 |
| 1,307,901 | Farland et al. | June 24, 1919 |
| 2,366,729 | Hanson | Jan. 9, 1945 |
| 2,444,874 | Hanson | July 6, 1948 |
| 2,466,025 | Hanson | Apr. 5, 1949 |
| 2,480,055 | Seaton | Aug. 23, 1949 |